United States Patent
Bofias

(10) Patent No.: US 6,718,842 B1
(45) Date of Patent: Apr. 13, 2004

(54) SHIFT LEVER UNIT

(75) Inventor: Josep Bofias, Sabadell (ES)

(73) Assignee: Fico Triad, Rubi (ES)

(*) Notice: Subject to any disclaimer, the term of this patent is extended or adjusted under 35 U.S.C. 154(b) by 0 days.

(21) Appl. No.: 09/743,865

(22) PCT Filed: Jul. 13, 1999

(86) PCT No.: PCT/EP99/04946

§ 371 (c)(1), (2), (4) Date: Mar. 26, 2001

(87) PCT Pub. No.: WO00/04307

PCT Pub. Date: Jan. 27, 2000

(30) Foreign Application Priority Data

Jul. 16, 1998 (DE) .......................... 198 32 086

(51) Int. Cl.⁷ .............................................. B60K 20/00
(52) U.S. Cl. ................. 74/473.33; 74/473.12; 74/473.21; 74/473.23; 74/473.28
(58) Field of Search .................. 74/473.18, 473.21, 74/473.22, 473.23, 473.28, 473.3, 473.33, 473.12

(56) References Cited

U.S. PATENT DOCUMENTS

| | | | |
|---|---|---|---|
| 4,022,078 A | | 5/1977 | Malott |
| 4,519,266 A | * | 5/1985 | Reinecke ............. 116/DIG. 20 |
| 4,631,984 A | * | 12/1986 | Jones ....................... 74/473.12 |
| 5,064,975 A | | 11/1991 | Boucher |
| 5,243,871 A | | 9/1993 | Weiten |
| 5,307,013 A | * | 4/1994 | Santos et al. ............. 324/207.2 |
| 5,388,476 A | * | 2/1995 | Harger et al. ............... 74/473.1 |
| 5,388,477 A | | 2/1995 | Frei et al. |
| 5,406,860 A | | 4/1995 | Easton et al. |
| 5,588,934 A | * | 12/1996 | Osborn et al. ................. 192/44 |
| 5,852,953 A | * | 12/1998 | Ersoy ........................ 74/471 X |
| 6,289,756 B1 | * | 9/2001 | Roemen et al. ................ 74/335 |
| 6,336,373 B1 | * | 1/2002 | Murai et al. ............. 192/220.4 |
| 6,415,677 B1 | * | 7/2002 | Skogward ............... 324/117 H |

FOREIGN PATENT DOCUMENTS

| | | |
|---|---|---|
| DE | 42 90 856 T 1 | 2/1994 |
| DE | 44 17 577 A 1 | 11/1994 |
| DE | 196 08 981 A 1 | 9/1997 |
| DE | 197 09 194 A 1 | 10/1997 |
| EP | 0 731 293 | * 11/1996 |
| FR | 2 731 393 A 1 | 3/1995 |

\* cited by examiner

*Primary Examiner*—Jack Lavinder
*Assistant Examiner*—Bradley King
(74) *Attorney, Agent, or Firm*—Renner, Otto, Boisselle & Sklar, LLP

(57) ABSTRACT

Shift lever unit for transforming the tilting movements of a shift lever (1) in electrical control signals, in particular for controlling a gearbox, with a shift lever, a rotating element (30, 3') which is rotated by the tilting movements of the shift lever (1) and a sensor (32, 41) detecting the angular position of the rotating element (30, 3') and transforming it into electrical signals.

18 Claims, 3 Drawing Sheets

Figure 1:
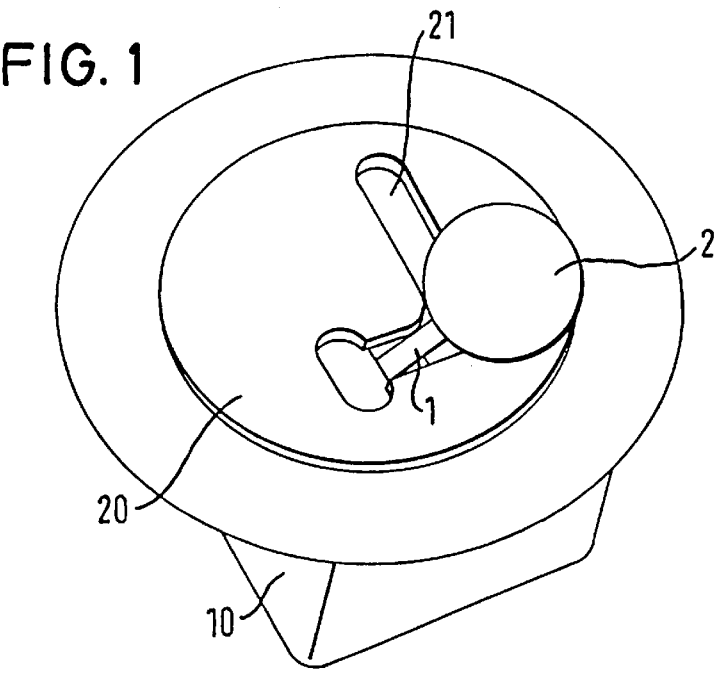

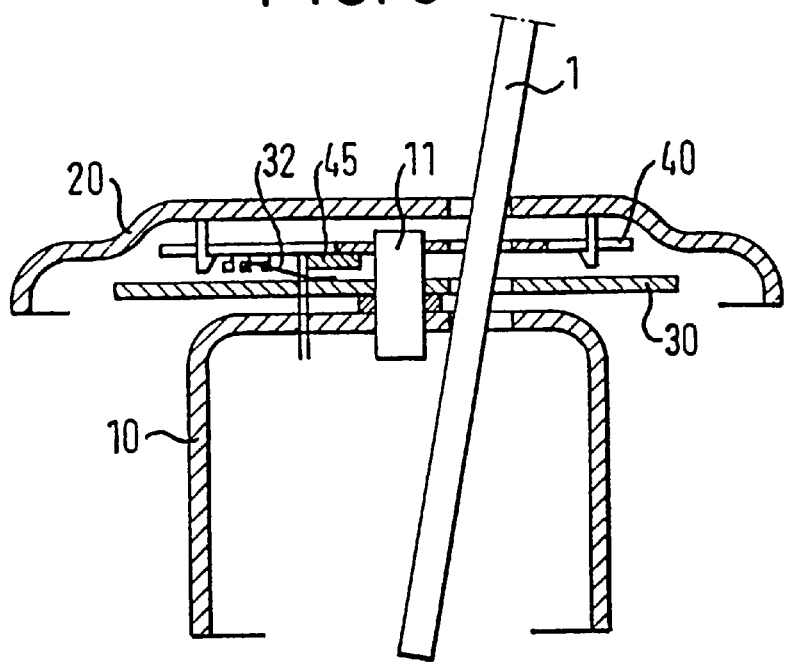
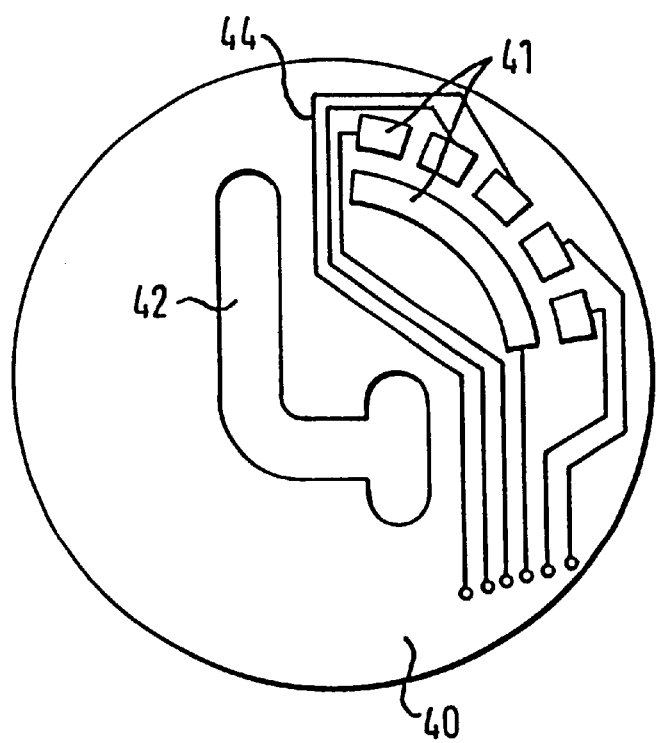

SHIFT LEVER UNIT

This application is a national phase of International Applicaton No. PCT/EP99/04946 filed Jul. 13, 1999 and published in the English language.

1. TECHNICAL FIELD

The present invention relates to a shift lever unit for transforming the movements of a shift lever in electrical controls signals. The invention relates in particular to a shift lever unit for the electrical control of a gearbox, preferably for the use in a motor vehicle.

2. THE PRIOR ART

In a motor vehicle the movements of a shift lever for changing the gears are typically mechanically transmitted to the gearbox of the vehicle. To this end, the tilting of the shift lever is in the shift lever unit transformed in longitudinal movements of several bowden cables or a linkage. The bowden cables or the linkage are connected to the gearbox and cause the changing of the gears.

This purely mechanical control, however, involves all disadvantages which are related to the use of moving mechanical parts. For example, considerable maintenance work is necessary for the regular lubrication of the bowden cables or the bearings of the linkage. Further, the replacement of one of the mechanical components causes high costs, since at least parts of the shift lever unit and the gearbox as well as the bowden cables or the linkage have to be taken apart and subsequently put together again.

For avoiding these problems, it has therefore been considered to electrically control the gearbox of the vehicle, that is, electrical control signals operate mechanical actuating means at the gearbox which perform the desired shift of the gear. The electrical control allows further an electronic supervision of the shifting. Thus, shifting mistakes and the corresponding damages to the gearbox can be avoided.

In spite of these advantages, electrically controlled gearboxes have up to now not been accepted. This is in particularly due to the customers which have been used for decades to purely mechanical gear shifters. Typical operating means for electrical control signals, as for example push buttons or rotary switches etc., differ in their use fundamentally from the normal shifting unit of a purely mechanical shift control.

The DE 196 08 981 discloses a shift lever unit of considerable size and complexity, where the rotations of a shift lever around two axes cause a sliding movement of a control element arranged below the lower end of the shift lever. The control element comprises reflecting areas which are used by several sensors to detect the position of the control element and to transform the movements of the shift lever in electrical control signals for a gear box of a vehicle.

It is therefore the problem of the present invention to provide a compact and simple (and therefore not expensive) shift lever unit which reliably transforms the familiar movements of a shift lever into electrical signals for the control of a gearbox.

3. SUMMARY OF THE INVENTION

The invention relates to a shift lever unit for transforming the tilting movements of a shift lever in electrical control signals, in particular for the control of a gear box, with a shift lever, a rotating element which is rotated by the tilting movements of the shift lever and a sensor detecting the angular position of the rotating element and transforming it into electrical signals. The pattern of the movements of the shift lever (length of the movement, different tilting directions) corresponds exactly to the typical movements during shifting with a purely mechanical gear shifter so that it is not necessary to get used to operate the electrical shift lever unit. The rotating element rotated by the shift lever during shifting assigns each shifting position an angular position. The sensor detects this angular position and provides a corresponding electrical output signal. Thus, the movements of the shift lever are in an unambiguous way transformed into electrical control signals for the gearbox.

Preferably, the rotating element is arranged above a suspension of the shift lever, so that a compact size of the shift lever unit is obtained. This further allows an easy access to the sensor in case a repair or a replacement is necessary.

According to a first preferred embodiment, the rotating element is a rotatably arranged disk and the shift lever extends through a slit in the disk so that a tilting of the shift lever causes a rotation of the disk.

According to a further preferred embodiment, the rotating element is a rotatably arranged hemisphere and the lever extends through a slit in the hemisphere so that a tilting of the shift lever causes a rotation of the hemisphere.

Preferably, the sensor comprises a contact element arranged on the rotating element and corresponding contact areas, electrically contacted by the contact element. According to a further preferred embodiment, the sensor comprises a magnetic contact, arranged on the rotating element and causing in at least one corresponding magnetic field sensor an electrical signal. The magnetic field sensor is preferably a Hall generator. According to yet another preferred embodiment, the sensor comprises a light source arranged on the rotating element and causing in at least one corresponding photo cell an electrical signal.

The rotating element comprises preferably on its circumference at least one notch which a spring engages to lock the rotating element in a predetermined angular position. The angular position corresponds preferably to a contact between the contact element and a contact area or the generation of an electric signal by the magnetic contact or the light source, respectively. The spring comprises preferably a roll at its upper end rolling along the circumference of the disk. These features provide the typical "latch feeling" as in case of a mechanical gear shifter, when a gear is selected.

Preferably, the shift lever unit according to the invention further comprises a blocking device which can block the rotations of the rotating element. The blocking may for example be used, if unallowed gear shifts (for example the unintended change into reverse) is to be avoided. A further possible use is the combination with the security system of the vehicle. To this end, the gearbox is blocked together with the application of an electronic immobilizer and/or a central locking unit of the car.

Further improvements of the invention are the subject matter of the dependent claims.

4. SHORT DESCRIPTION OF THE DRAWING

Figure 2:
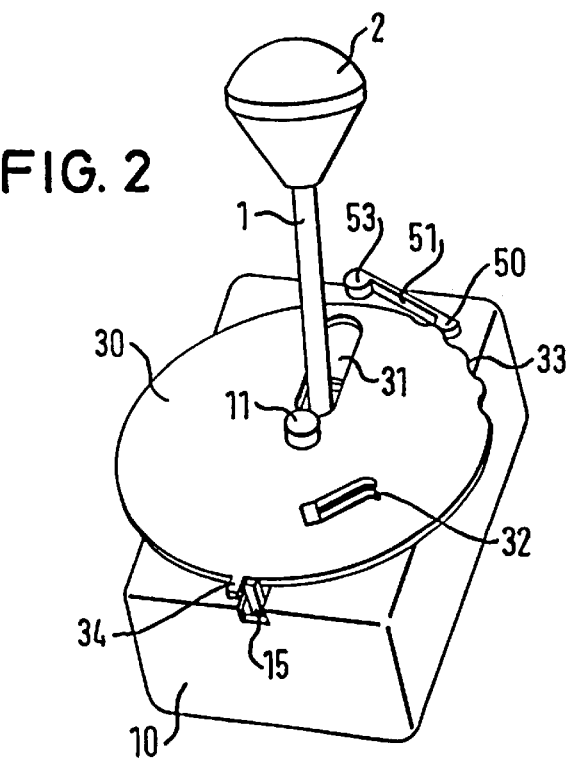
Figure 5:
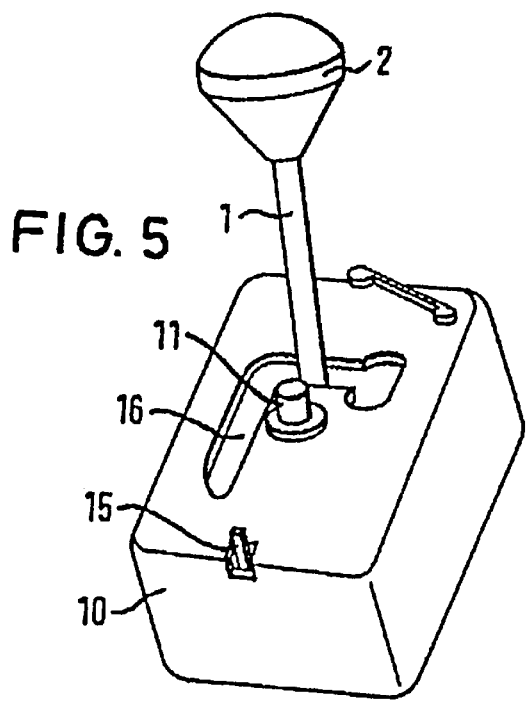
Figure 6:
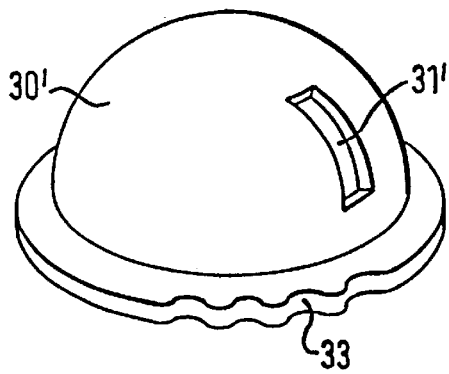
Figure 7:
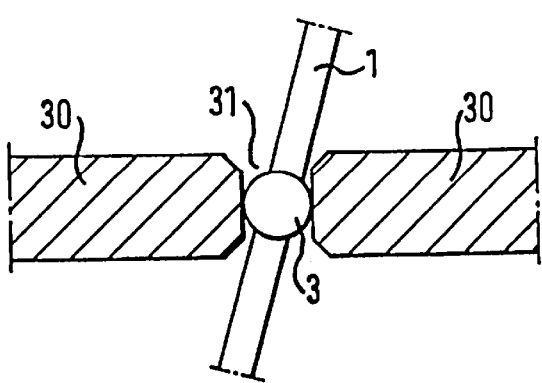

FIG. 1: A perspective view of the complete shift lever unit;

FIG. 2: A view of the shift lever unit without the cover;

FIG. 3: An elevational view of the complete shift lever unit;

FIG. 4: A view of the contact areas of the sensor according to a preferred embodiment;

FIG. 5: A view of the shift lever unit without cover and without the rotating element;

FIG. 6: A further preferred embodiment of the rotating element;

FIG. 7: A detailed view of the area where the shift lever extends through the disk or hemisphere.

5. DETAILED DESCRIPTION OF THE INVENTION

With reference to the embodiment shown in FIG. 1 the shift lever unit comprises a shift lever 1 having a bearing in a housing 10 so that it can be tilted in several directions. This may preferably be achieved by a suspension on several rotating axes (not shown) or by the use of a ball-and-socket joint (not shown). At its upper end, the shift lever 1 has a knob 2 for moving the shift lever 1.

The other components of the shift lever unit are preferably covered by the cover 20 having preferably in its center a sparing 21 in which the shift lever moves and whose shape corresponds to the gear shifting gate 16 (see below). The sparing 21 is simplified shown in FIG. 1 having the shape of a mirrored "L"; depending on the number of gears more complex shapes will be used in reality. The design of the cover, that is, its external shape, color etc. may be adapted to the design of the interior of the vehicle and is without any influence on the functions of the shift lever unit. Alternatively to the disk-like cover shown in FIG. 1 also a flexible cover (not shown) may be used.

The possible shift positions of the shift lever 1 are determined by the shape of the shifting gate 16 on the upper side of the housing 10 (see also FIG. 5). Here also only a simplified embodiment with the shape of a mirrored "L" is exemplary shown which might be modified depending on the numbers of gears of the vehicle.

FIG. 2 shows a preferred embodiment of the shift lever unit after the cover 20 has been removed. On a preferably vertically arranged axis 11 on the housing 10 (see also FIG. 5) a disk 30 is rotatably arranged. The disk 30 comprises a slit 31 through which the shift lever 1 extends. The slit 31 is preferably inclined oriented with respect to the tilting directions of the shift lever. The straight radial shape of the slit 31 shown in FIG. 2 is only one possibility, a curved shape is also conceivable. Under a movement of the shift lever 1 the disk 30 is rotated around its axis 11 so that an angular position of the disk 30 is unambiguously assigned to each position of the shift lever 1.

FIG. 7 shows a detailed view of a preferred embodiment for transforming the tilting movements of the shift lever 1 into the rotating movements of the disk 30. The shift lever 1 comprises in the area which is arranged inside the slit 31 of the disk 30 a ball-like thickening 3. Thereby any jamming between the shift lever 1 and the disk 30 is effectively avoided.

With reference to FIG. 2 an electrical contact element 32 is according to a first preferred embodiment preferably arranged on the upper side of the disk 30 extending upwardly with an inclination. The contact element 32 consists preferably of a double flexible metal stripe with good contact properties. As can be seen in the elevational view of FIG. 3, a printed circuit board 40 is preferably above the disk 30 arranged on the cover 20. Preferably on the lower side of this printed circuit board 40 several contact areas 41 are provided (see FIG. 4) which form an electrical contact with the contact element 32, if the disk 30 is in the respective angular positions.

The printed circuit board 40 extends preferably above of the complete disk 30 and comprises as the cover 20 a sparing 42 in order not to hinder the movements of the shift lever 1.

According to a second preferred embodiment (not shown) a magnetic contact is arranged on the disk 30. In this case magnetic field sensors are provided on the printed circuit board 40 instead of the contact areas 41, which are triggered by the magnetic contact. The magnetic field sensors are preferably so-called Hall generators. The advantage of this more expensive embodiment is that a mechanical wear by the repeated closing and opening of the electrical contact between the contact element 32 and the contact areas 41 is avoided.

According to a further preferred embodiment (not shown), a light source is provided on the disk 30 instead of the contact element 32, preferably a photodiode. The photodiode causes an electrical signal in photo cells which are instead of the contact areas 41 provided on the printed circuit board 40. Also in this case no mechanical wear arises so that a long lifetime is assured.

The contact areas/magnetic field sensors/photo cells are preferably connected by the cables 44 to further electronic circuitry 45 (schematically indicated in FIG. 3) on the printed circuit board 40 to further process the electrical signals before they are transmitted from the shift lever unit to the electrically controlled gear box (not shown).

The circumference of the disk 30 preferably comprises in several position notches 33 (see FIG. 2). A roll 50 rolls along the circumference which is by an oblong support 51 connected to a spring 53 which in turn is mounted to the housing 10. The spring is preloaded so that the support 51 and the roll 50 are clockwise rotated. Instead of the support 51 and the spring 53 also a flexible support made out of an elastomer (not shown) may be used having the roll 50 mounted to its end.

If the roll 50 is in a notch 33, a force, defined by the spring constant of the spring 53, is necessary to rotate the disk 30 and to move thereby the roll from the notch 33. The positions of the notches 33 on the disk 30 correspond to the respective electrical contacts between the contact element 32 on the disk and the contact areas 41 on the printed circuit board 40 or the triggering of signals in case of a magnetic or optical detection of the angular position of the disk 30. As a result, a "locking feeling" into a selected position is provided for the movements of the shift lever 1 as in the case of a purely mechanical gear shift. The locking can be exactly controlled by the shape of the notches 33; the more steep the flanks and the deeper the notch 33 the greater is the resistance to move the shift lever 1 from one shifting position to another. Since a single notch 33 on the circumference on the disk is assigned to each shifting position, the "locking feeling" may be differently designed for different gears (for example the reverse).

Preferably, a projection 34 is provided at a different part of the circumference of the disk 30 (cf. FIG. 2). For blocking the disk 30 a pin 15 is preferably mounted to the housing 10 which can be electrically extended and retracted. The movement of the pin 15 is preferably caused by a solenoid (not shown). However, also a movement by a small electric motor (not shown) is conceivable. According to a further preferred embodiment, the pin 15 engages an opening (not shown) of the disk 30 and blocks thereby the rotation of the disk 30. The blocking may either be manually operated by a switch (not shown) or by an electronic control (not shown). In the second case shifting errors (for example changing into reverse at high speed) can be avoided.

A further possibility is the combination of the blocking of the shift lever unit with a security system against theft. To this end the blocking of the disk is simultaneously operated with an electronic immobilizer (not shown) and/or a central locking unit (not shown) of the vehicle. If the gear shifter is blocked with a gear being engaged, the vehicle is additionally secured against an unauthorized towing away or rolling off.

According to a further preferred embodiment shown in FIG. 6, a hemisphere 30' is provided instead of the above mentioned disk 30. In this case the slit 31' extends on the surface of the hemisphere 30'. Since the shift lever extends only for a short part from the hemisphere 30' any distortions of the shift lever 1 are thereby reduced. The above mentioned devices for detecting the angular position are in this embodiment correspondingly arranged on the lower side of the hemisphere 30' (not shown).

The major part of the above described parts are preferably produced by injection molding of plastic materials in order to reduce costs and weight. For the housing 10 preferably fiber glass reinforced polyamide (PA) is used and for the cover preferably polycarbonate (PC). The disk 30 or the hemisphere 30' are as well as the projection 34 preferably made out of polyoxymetylene (POM). The shift lever 1, which is subjected to the greatest mechanical strain, is made out of steel (F-2114). The spring 53 is preferably a steel spring whereas the oblong support 51 and the roll 50 are preferably made out of polyamide. For the flexible contact element 32 preferably an electrolytic refined copper sheet is used. The printed circuit board 40 with the cables 44, the contact areas 41 and the additional electronic components 45 are produced according to known procedures for printed circuit boards. The starting material is preferably bakelite or fiberglass (FR2 of FR4). The preferably magnetically moved pin 15 is preferably made out of a ferromagnetic alloy.

What is claimed is:

1. A shift lever unit for transforming the tilting movements of a shift lever into electrical control signals, in particular for controlling a gearbox, comprising:
   a) a shift lever mounted by a bearing in a housing for tilting movements;
   b) a rotating element arranged above the bearing and interacting with the shift lever such that the tilting movements of the shift lever effect rotation of the rotating element, the rotating element being a rotatably arranged disk and the shift lever extending through a slit in the disk so that a tilting of the shift lever causes a rotation of the disk; and
   c) a sensor detecting the angular position of the rotating element and transforming it into electrical signals.

2. A shift lever unit according to claim 1 where the shift lever comprises a rounded thickening in the area where it extends through the disk to avoid a jamming of the shift lever.

3. A shift lever unit according to claim 1 where the sensor comprises a contact element arranged on the rotating element and corresponding contact areas electrically contacted by the contact element.

4. A shift lever unit according to claim 1 where the sensor comprises a magnetic contact arranged on the rotating element and causing an electrical signal in at least one corresponding magnetic field sensor.

5. A shift lever unit according to claim 4 where the magnetic field sensor is a Hall generator.

6. A shift lever unit according to claim 1 where the sensor comprises a light source arranged on the rotating element causing an electrical signal in at least one corresponding photo cell.

7. A shift lever unit according to claim 1 where the rotating element comprises on a circumference at least one notch which a spring engages to lock the rotating element in a predetermined angular position.

8. A shift lever unit according to claim 7 where the angular position corresponds to one of a contact between a contact element and a contact area, the generation of an electrical signal by a magnetic contact, and generation of an electrical signal by a light source.

9. A shift lever unit according to claim 7 where the spring comprises at its upper end a roll rolling along the circumference of the rotating element.

10. A shift lever unit according to claim 1 further comprising a blocking device to limit the rotation of the rotating element.

11. A shift lever unit according to claim 10 where the blocking device comprises a projection of the rotating element and a moveable pin interacting with the projection to block the rotation of the rotating element.

12. A shift lever unit according to claim 10 where the blocking device comprises an opening in the rotating element and a moveable pin which can extend into the opening to block the rotation of the rotating element.

13. A shift lever unit according to claim 11 where the pin is moved by a solenoid or an electric motor.

14. A shift lever unit according to claim 10 where the blocking device is combined with a anti-theft system of a vehicle.

15. A shift lever unit according to claim 12 where the pin is moved by a solenoid or an electric motor.

16. A gear shift for changing the gears in a motor vehicle comprising:
   a) an electro-mechanical gearbox;
   b) electrical control lines; and
   c) the shift lever unit according to claim 1.

17. A shift lever unit for transforming the tilting movements of a shift lever into electrical control signals, in particular for controlling a gearbox, comprising:
   a) a shift lever mounted by a bearing in a housing for tilting movements;
   b) a rotating element arranged above the bearing and interacting with the shift lever such that the tilting movements of the shift lever effect rotation of the rotating element, the rotating element being a rotatably arranged hemisphere and the shift lever extending through a slit in the hemisphere so that a tilting of the shift lever causes a rotation of the hemisphere; and
   c) a sensor detecting the angular position of the rotating element and transforming it into electrical signals.

18. A shift lever unit according to claim 17 where the shift lever comprises a rounded thickening in the area where it extends through the hemisphere to avoid a jamming of the shift lever.

* * * * *